(12) United States Patent
Sutivong et al.

(10) Patent No.: US 9,137,822 B2
(45) Date of Patent: Sep. 15, 2015

(54) EFFICIENT SIGNALING OVER ACCESS CHANNEL

(75) Inventors: Arak Sutivong, San Diego, CA (US); Edward Harrison Teague, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2401 days.

(21) Appl. No.: 11/020,457

(22) Filed: Dec. 22, 2004

(65) Prior Publication Data

US 2006/0018336 A1 Jan. 26, 2006

Related U.S. Application Data

(60) Provisional application No. 60/590,113, filed on Jul. 21, 2004.

(51) Int. Cl.
*H04B 7/212* (2006.01)
*H04W 74/00* (2009.01)
*H04L 1/00* (2006.01)
*H04L 1/16* (2006.01)
(Continued)

(52) U.S. Cl.
CPC ........... *H04W 74/004* (2013.01); *H04L 1/0026* (2013.01); *H04L 1/1692* (2013.01); *H04W 52/04* (2013.01); *H04W 72/085* (2013.01); *H04W 74/0833* (2013.01)

(58) Field of Classification Search
CPC . H04W 52/50; H04W 52/32; H04W 74/0833; H04W 84/08; H04W 80/04; H04W 84/18; H04W 88/06; H04W 74/08; H04W 36/18; H04L 27/265; H04L 5/0046; H04L 5/003; H04L 5/0058

USPC ......... 370/343, 349, 437, 341, 480, 315, 210; 455/452, 449, 226.3, 67.13, 450; 375/144, 130, 341; 725/123
See application file for complete search history.

(56) References Cited

U.S. PATENT DOCUMENTS

| 4,393,276 A | 7/1983 | Steele |
| 4,747,137 A | 5/1988 | Matsunaga |

(Continued)

FOREIGN PATENT DOCUMENTS

| AU | 2005319084 | 4/2010 |
| CA | 2348137 | 11/2001 |

(Continued)

OTHER PUBLICATIONS

International Search Report, PCT/US05/024614, International Search Authority, European Patent Office—Oct. 20, 2005.

(Continued)

*Primary Examiner* — Awet Haile
(74) *Attorney, Agent, or Firm* — Ashish L. Patel

(57) ABSTRACT

An apparatus and method for transmitting an indicator of channel quality while minimizing the use of a broadcast channel is described. A metric of forward link geometry of observed transmission signals is determined. An indicator of channel quality value is determined as a function of the observed transmission signals. An access sequence is selected, randomly, from one group of a plurality of groups of access sequences, wherein each of the plurality of groups of access sequences correspond to different ranges of channel quality values.

33 Claims, 8 Drawing Sheets

(51) Int. Cl.
  *H04W 52/04* (2009.01)
  *H04W 72/08* (2009.01)
  *H04W 74/08* (2009.01)

(56) References Cited

U.S. PATENT DOCUMENTS

| | | |
|---|---|---|
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,953,325 A | 9/1999 | Willars |
| 5,955,992 A | 9/1999 | Shattil |
| 5,956,642 A * | 9/1999 | Larsson et al. ............... 455/449 |
| 5,995,992 A | 11/1999 | Eckard |
| 5,999,826 A | 12/1999 | Whinnett |
| 6,002,942 A | 12/1999 | Park |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,388,998 B1 | 5/2002 | Kasturia |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,636,568 B2 | 10/2003 | Kadous |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 * | 1/2004 | Dick et al. ................... 375/130 |
| 6,674,810 B1 | 1/2004 | Cheng |
| 6,675,012 B2 | 1/2004 | Gray |
| 6,678,318 B1 | 1/2004 | Lai |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Zehavi et al. |
| 6,724,719 B1 | 4/2004 | Tong et al. |
| 6,731,602 B1 | 5/2004 | Watanabe et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,862,271 B2 | 3/2005 | Medvedev et al. |
| 6,870,808 B1 | 3/2005 | Liu et al. |

(56) References Cited

U.S. PATENT DOCUMENTS

| | | |
|---|---|---|
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Kadous |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissensohn |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,532 B2 | 11/2008 | Chae et al. |
| 7,450,548 B2 | 11/2008 | Haustein et al. |
| 7,460,466 B2 | 12/2008 | Lee et al. |

(56) References Cited

U.S. PATENT DOCUMENTS

| | | |
|---|---|---|
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,446,892 B2 | 5/2013 | Ji et al. |
| 8,462,859 B2 | 6/2013 | Sampath et al. |
| 8,582,509 B2 | 11/2013 | Khandekar et al. |
| 8,582,548 B2 | 11/2013 | Gore et al. |
| 2001/0021180 A1 | 9/2001 | Lee et al. |
| 2001/0024427 A1 | 9/2001 | Suzuki |
| 2001/0030948 A1 | 10/2001 | Tiedemann, Jr. |
| 2001/0053140 A1 | 12/2001 | Choi et al. |
| 2001/0055293 A1 | 12/2001 | Parsa et al. .................... 370/342 |
| 2001/0055294 A1 | 12/2001 | Motoyoshi |
| 2002/0003792 A1* | 1/2002 | Schmidl et al. ............... 370/343 |
| 2002/0015405 A1 | 2/2002 | Sepponen et al. |
| 2002/0018157 A1 | 2/2002 | Zhang et al. |
| 2002/0044524 A1 | 4/2002 | Laroia et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0122383 A1 | 9/2002 | Wu et al. |
| 2002/0122400 A1 | 9/2002 | Vayanos et al. |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0193146 A1 | 12/2002 | Wallace et al. |
| 2003/0002464 A1 | 1/2003 | Rezaiifar et al. |
| 2003/0027579 A1 | 2/2003 | Sydon |
| 2003/0035491 A1 | 2/2003 | Walton et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1* | 4/2003 | Jia et al. .................... 375/341 |
| 2003/0073409 A1 | 4/2003 | Nobukiyo et al. |
| 2003/0073464 A1 | 4/2003 | Giannakis et al. |
| 2003/0076878 A1 | 4/2003 | Jones et al. |
| 2003/0076890 A1 | 4/2003 | Hochwald et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0142648 A1 | 7/2003 | Semper |
| 2003/0147371 A1 | 8/2003 | Choi et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0223452 A1 | 12/2003 | Taskala et al. ................ 370/442 |
| 2003/0228865 A1 | 12/2003 | Hwang |
| 2003/0235255 A1 | 12/2003 | Ketchum et al. |
| 2004/0002364 A1 | 1/2004 | Tirkkonen |
| 2004/0015692 A1 | 1/2004 | Green et al. |
| 2004/0017785 A1 | 1/2004 | Zelst |
| 2004/0038697 A1 | 2/2004 | Attar et al. |
| 2004/0048609 A1 | 3/2004 | Kosaka |
| 2004/0058687 A1 | 3/2004 | Kim et al. |
| 2004/0066761 A1 | 4/2004 | Giannakis et al. |
| 2004/0066772 A1 | 4/2004 | Moon et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081195 A1 | 4/2004 | El-Maleh et al. |
| 2004/0086055 A1 | 5/2004 | Li |
| 2004/0087325 A1 | 5/2004 | Cheng et al. |
| 2004/0097215 A1 | 5/2004 | Abe et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton |
| 2004/0125792 A1 | 7/2004 | Bradbury et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0179480 A1 | 9/2004 | Attar et al. |
| 2004/0179494 A1 | 9/2004 | Attar et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190486 A1* | 9/2004 | Oshiba .................... 370/349 |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1* | 12/2004 | Cho et al. .................... 370/480 |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1* | 1/2005 | Wintzell .................... 455/226.3 |

(56) References Cited

U.S. PATENT DOCUMENTS

| | | |
|---|---|---|
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous |
| 2005/0053081 A1 | 3/2005 | Andersson et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0075073 A1 | 4/2005 | Kadous et al. |
| 2005/0085197 A1 | 4/2005 | Laroia et al. |
| 2005/0085236 A1 | 4/2005 | Gerlach et al. |
| 2005/0088959 A1 | 4/2005 | Kadous |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0138671 A1* | 6/2005 | Love et al. .................. 725/123 |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195852 A1 | 9/2005 | Vayanos et al. |
| 2005/0195886 A1* | 9/2005 | Lampinen et al. ............ 375/144 |
| 2005/0201296 A1 | 9/2005 | Vannithamby et al. |
| 2005/0207367 A1* | 9/2005 | Onggosanusi et al. ....... 370/315 |
| 2005/0215196 A1 | 9/2005 | Krishnan et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254467 A1* | 11/2005 | Li et al. ........................ 370/335 |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0265470 A1 | 12/2005 | Kishigami et al. |
| 2005/0276347 A1 | 12/2005 | Mujtaba et al. |
| 2005/0276348 A1 | 12/2005 | Vandenameele |
| 2005/0277423 A1* | 12/2005 | Sandhu et al. ................ 455/450 |
| 2005/0281290 A1 | 12/2005 | Khandekar et al. |
| 2005/0282500 A1* | 12/2005 | Wang et al. ................ 455/67.13 |
| 2005/0286408 A1 | 12/2005 | Jin et al. |
| 2005/0286465 A1* | 12/2005 | Zhuang ........................ 370/329 |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018347 A1 | 1/2006 | Agrawal |
| 2006/0018397 A1 | 1/2006 | Sampath |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0111054 A1 | 5/2006 | Pan et al. |
| 2006/0114858 A1 | 6/2006 | Walton |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0110172 A1 | 5/2007 | Faulkner et al. |

(56) References Cited

U.S. PATENT DOCUMENTS

| | | |
|---|---|---|
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0211668 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 8461997 | 1/1998 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |
| CL | 29062006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 A | 4/2002 |
| CN | 1383631 A | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 | 1/2004 |
| CN | 1520220 | 8/2004 |
| CN | 1525678 | 9/2004 |
| CN | 164205 A | 7/2005 |
| CN | 1636346 | 7/2005 |
| CN | 1642335 A | 7/2005 |
| CN | 1647436 | 7/2005 |
| CN | 1487755 | 4/2007 |
| DE | 19800953 C1 | 7/1999 |
| DE | 19957288 C1 | 5/2001 |
| DE | 10240138 | 8/2003 |
| DE | 10254384 | 6/2006 |
| EP | 0488976 A2 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 A1 | 5/2002 |
| EP | 1255369 A1 | 11/2002 |
| EP | 1267513 A2 | 12/2002 |
| EP | 1074099 B1 | 2/2003 |
| EP | 1286490 A2 | 2/2003 |
| EP | 1335504 A2 | 8/2003 |
| EP | 1351538 A1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1538863 A1 | 6/2005 |

(56) References Cited

FOREIGN PATENT DOCUMENTS

| | | |
|---|---|---|
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 A1 | 1/1987 |
| GB | 2279540 A | 1/1995 |
| GB | 2348776 A | 10/2000 |
| GB | 2412541 | 9/2005 |
| IL | 167573 | 2/2011 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 | 1/2005 |
| JP | 2005502218 A | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 T | 2/2006 |
| JP | 2006506860 A | 2/2006 |
| JP | 2006211537 A | 8/2006 |
| JP | 2006524930 A | 11/2006 |
| JP | 2007503790 | 2/2007 |
| JP | 2007519281 T | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 4648302 | 12/2010 |
| JP | 04694628 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 | 10/2004 |
| RU | 2242091 C2 | 12/2004 |
| RU | 2003125268 | 2/2005 |

(56) References Cited

FOREIGN PATENT DOCUMENTS

| | | |
|---|---|---|
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302842 | 8/2003 |
| TW | 200401572 | 1/2004 |
| TW | 1232040 | 5/2005 |
| TW | 248266 | 1/2006 |
| TW | 200718128 | 5/2007 |
| WO | 9408432 | 4/1994 |
| WO | WO9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO9814026 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO9941871 A1 | 8/1999 |
| WO | WO9944313 | 9/1999 |
| WO | WO9944383 A1 | 9/1999 |
| WO | WO9952250 A1 | 10/1999 |
| WO | WO9953713 | 10/1999 |
| WO | WO9959265 | 11/1999 |
| WO | WO9960729 A1 | 11/1999 |
| WO | 0004728 | 1/2000 |
| WO | WO0002397 A2 | 1/2000 |
| WO | WO0033503 | 6/2000 |
| WO | 0041542 | 7/2000 |
| WO | 0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO0139523 A2 | 5/2001 |
| WO | 0145300 | 6/2001 |
| WO | WO0148969 A2 | 7/2001 |
| WO | WO0158054 A1 | 8/2001 |
| WO | WO0160106 | 8/2001 |
| WO | 0165637 A2 | 9/2001 |
| WO | WO0169814 A1 | 9/2001 |
| WO | WO0182543 A2 | 11/2001 |
| WO | WO0182544 A2 | 11/2001 |
| WO | WO0189112 A1 | 11/2001 |
| WO | WO0193505 | 12/2001 |
| WO | WO-0195427 A2 | 12/2001 |
| WO | WO0204936 A1 | 1/2002 |
| WO | WO0207375 | 1/2002 |
| WO | 0215432 A1 | 2/2002 |
| WO | WO0215616 | 2/2002 |
| WO | WO0219746 A1 | 3/2002 |
| WO | WO0231991 | 4/2002 |
| WO | WO0233848 A2 | 4/2002 |
| WO | 0245293 A2 | 6/2002 |
| WO | WO0245456 A1 | 6/2002 |
| WO | WO0249305 A2 | 6/2002 |
| WO | WO0249306 | 6/2002 |
| WO | WO0249385 A2 | 6/2002 |
| WO | 02060138 | 8/2002 |
| WO | WO02065675 | 8/2002 |
| WO | WO02082689 A2 | 10/2002 |
| WO | WO02082743 A2 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | WO03001696 A2 | 1/2003 |
| WO | WO03001761 A1 | 1/2003 |
| WO | WO03003617 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | 03075479 | 9/2003 |
| WO | WO03073646 | 9/2003 |
| WO | WO03085876 | 10/2003 |
| WO | WO03088538 A1 | 10/2003 |
| WO | WO03094384 | 11/2003 |
| WO | WO03103331 | 12/2003 |
| WO | WO04002047 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | WO2004030238 A1 | 4/2004 |
| WO | WO2004032443 A1 | 4/2004 |
| WO | 2004038984 A2 | 5/2004 |
| WO | 2004040825 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 | 11/2004 |
| WO | WO2004102816 A2 | 11/2004 |
| WO | 2004114564 | 12/2004 |
| WO | 2004114615 A1 | 12/2004 |
| WO | WO2004105272 A1 | 12/2004 |
| WO | WO2004114549 | 12/2004 |
| WO | WO2005002253 A1 | 1/2005 |
| WO | 2005018270 | 2/2005 |
| WO | WO2005011163 A1 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |

(56) References Cited

FOREIGN PATENT DOCUMENTS

| | | |
|---|---|---|
| WO | WO2005022811 A2 | 3/2005 |
| WO | WO2005025110 A2 | 3/2005 |
| WO | WO2005032004 A1 | 4/2005 |
| WO | 2005043780 A1 | 5/2005 |
| WO | 2005043855 | 5/2005 |
| WO | WO2005046080 | 5/2005 |
| WO | 2005055465 A1 | 6/2005 |
| WO | WO2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 | 8/2005 |
| WO | 2005086440 A1 | 9/2005 |
| WO | WO2005096538 | 10/2005 |
| WO | WO2005122628 | 12/2005 |
| WO | 2006007292 A2 | 1/2006 |
| WO | 2006019710 | 2/2006 |
| WO | WO2006019710 A1 | 2/2006 |
| WO | WO2006026344 | 3/2006 |
| WO | WO2006044487 | 4/2006 |
| WO | 2006062356 A1 | 6/2006 |
| WO | 2006069300 | 6/2006 |
| WO | 2006069301 | 6/2006 |
| WO | WO2006069300 A2 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | 2007022430 A2 | 2/2007 |
| WO | WO2007024934 | 3/2007 |
| WO | WO2007024935 | 3/2007 |
| WO | WO2007025160 | 3/2007 |
| WO | WO2007051159 | 5/2007 |

OTHER PUBLICATIONS

Written Opinion, PCT/US05/024614, International Search Authority, European Patent Office—Oct. 20, 2005.
International Preliminary Report on Patentability, PCT/US05/024614, IPEA, US—Oct. 27, 2006.
H. Sampath et al, "A Fourth Generation MIMO-OFDM Broadband Wireless System: Design, Performance and Field Trial Results", IEEE Communications Magazine, pp. 143-149, Sep. 2002.
Blum et al, "On Optimum MIMO with antenna selection," IEEE International Conference on Communications: Conference Proceedings, vol. 1, Apr. 28, 2002, pp. 386-390.
Catreux S et al: "Simulation Results for an Interference-Limited Multiple Input Multiple Output Cellular System" pp. 1094-1096; Globecom'00. 2000 IEEE Global Telecommunications Conference. San Francisco, CA, Nov. 27-Dec. 1, 2000.
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa M A et al: "Adaptive Binary Coding for Diversity Communication Systems" IEEE International Conference on Personal Wireless Communications Proceedings, pp. 80-84, XP000992269, 1997.
Prasad N et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Seong Taek Chung et al: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.

Gamal, et al., "Universal Space-Time Coding," IEEE Transactions on Information Theory, vol. 49, No. 5, May 2003, pp. 1097-1118.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Widdup et al., "A highly-parallel VLSI architecture for a list sphere detector," IEEE International Conference, Paris, France, vol. 5, pp. 2720-2725 (2004).
3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25.814 v0.3.1 (Nov. 2005).
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John Wiley & Sons, New York, XP-002199502. 2000, pp. 111-113.
Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004. Globecom '04, IEEE, vol. 5 IEEE Nov. 29-Dec. 3 2004, pp. 3068-3072.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Dinis R; Falconer D; Tong Lam C; Sabbaghian M: "A Multiple Access Scheme for the Uplink of Broadband Wireless Systems" Global Telecommunications Conference, 2004. Globecom 04. IEEE Dallas, TX, USA Nov. 29-Dec. 3, 2004, vol. 6, p. 3808-3812, XP010758449 Piscataway, NJ, USA, IEEE.
Don Torrieri, "Cellular Frequency-Hopping CDMA Systems," IEEE Vehicular Technology Conference, May 16, 1999, pp. 919-925, vol. 2.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Favre et al: "Self-Adaptive Transmission Procedure" IBM Technical Disclosure Bulletin, IBM Corporation, Sep. 1976, vol. 19, No. 4, pp. 1283-1284, New York, New York.

(56) References Cited

OTHER PUBLICATIONS

Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Groe, et al., "CDMA Mobile Radio Design," Sep. 26, 2001, Artech House, Norwood, MA 02062, pp. 257-259.
Hermann Rohling et al., : "Performance Comparison Of Different Multiple Access Schemes For the Downlink of an OFDM Communication System", Vehicular Technology Conference, 1997, 47th IEEE, vol. 3, May 3-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hui Won JE et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
John B. Groe, Lawrence E. Larson, "CDMA Mobile Radio Design" Sep. 26, 2001, Artech House, Norwood, MA02062 580530, XP002397967, pp. 157-159.
J.S. Chow and J.M. Cioffi: "A cost-effective maximum likelihood reciever for multicarrier systems", Proc. IEEE Int. Conf. On Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kenji Sumii et al., "A Study on Computational Complexity Reduction of Iterative Decoding for Turbo-coded MIMO-SDM Using Sphere Decoding," Technical Report of IEICE. RCS, Feb. 23, 2005, vol. 104, pp. 43-48.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kishiyama et al., Investigation of optimum pilot channel structure for VSF-OFCDM broadband wireless access in forward link, VTC 2003-Spring, The 57th IEEE Semiannual Vehicular Technology Conference, Proceedings JEJU, Korea, Apr. 22-25, 2003, pp. 139-144.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," Spread Spectrum Techniques and Applications, 2002 IEEE Seventh International Symposium, Sep. 2, 2002, pp. 44-48, XP010615562.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Molisch, et al., MIMO systems with antenna selection, IEEE Microwave Magazine, Mar. 2004, pp. 46-56, XP002411128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. On Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Natarajan, et al., "High-Performance MC-CDMA via Carrier Interferometry Codes," IEEE Transactions on Vehicular Technology, 2001, vol. 50 (issue 6).
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
NTT DoCoMo, et al.: "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
Qualcomm Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; 20051004, Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. Globecom 93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell et al., "Application of IFDMA to Mobile Radio Transmission", IEEE 1998 International Conference on Universal Personal Communications, vol. 2, Oct. 5-9, 1998, pp. 1267-1272.
Schnell et al.,: "A Promising New Wideband Multiple-Access Scheme for Future Mobile Communications Systems" European Transactions on Telecommunications, vol. 10, No. 4, Jul. 1999, pp. 417-427.
Shattil et al., "Array Control Systems for Multicarrier Protocols Using a Frequency-Shifted Feedback Cavity", Radio and Wireless Conference EEE, Aug. 1-4, 1999, pp. 215-218.

(56) References Cited

OTHER PUBLICATIONS

Sorger U., et al., "Interleaved FDMA-A New Spread-Spectrum Multiple-Access Scheme, XP010284733," Communications, Conference Record, IEEE, Atlanta, GA, 1998, 1013-1017.
Taiwanese Search report—095139893—TIPO—Dec. 30, 2010.
Telecommunications Industry Association, "Mobile Station-Base Station Compatibility Standard for Dual-Mode Wideband Spread Spectrum Cellular System," TIA/EIA-95, Jul. 1993.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA/EIA/IS-2000 Standards for CDMA2000 Spread Spectrum Systems 3GPP2 C.S0001-0 Version 1.0, Jul. 1999.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik J, "MBFDD and MBTDD Wideband Mode: Technology Overview", IEEE 802.20 Working Group Mobile Broadband Wireless Access, Jan. 6, 2006, 1-109.
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik, T.: "QTDD Performance Report 2", IEEE C802.20-05/88, IEEE 802.20 Working Group on Mobile Broadband Wireless Access, http://ieee802.org/20/, pp. 1-56, XP002386798 (Nov. 15, 2005).
Toufik, I. et al., Channel allocation algorithms for multi-carrier systems, Vehicular Technology Conference 2004, VTC2004-Fall, 2004 IEEE 60th Los Angeles, CA, USA Sep. 26-29, 2004, Piscataway, NJ, USA IEEE, Sep. 26, 2004, pp. 1129-1133, XP010786798.
Translation of Office Action in chinese application 2006800295980 corresponding to U.S. Appl. No. 11/260,895, citing CN1346221 and CN1383631 dated Feb. 16, 2011.
Translation of Office Action in Japanese application 2008-514880 corresponding to U.S. Appl. No. 11/445,377, citing WIDDUP_highly_parallel_VLSI_architecture_pp_2720_2725_year_2004, Kenji_A_Study_on_Computational_pp_43_48_year_2005, Yongmei_A_List_Sphere_Decoder_pp_804-808_year_2004, JP2007519281 and JP2006505172 dated Nov. 9, 2010.
Translation of Office Action in Japanese Application 2008-529216 corresponding to U.S. Appl. No. 11/261,159 , citing GB2348776 , WO2004098222, WO2005065062 and WO2004102815.Dated Jan. 11, 2011.
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, p. 36-40, XP010713463.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yongmei Dai et al. 'A List Sphere Decoder based turbo receiver for group wise space time trellis coded (GSTTC) systems' IEEE (2004).
Yun et al., "Performance Of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Zekri, et al., "DMT Signals with Low Peak-to-Average Power Ratio," Proceedings, IEEE International Symposium on Computers and Communications, 1999, Jul. 6-8, 1999, pp. 362-368.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Taiwan Search Report—TW094123763—TIPO—Aug. 8, 2011.
Viswanath P et al: "Opportunistic beamforming using dumb antennas" IEEE Transactions on Information Theory IEEE USA, vol. 48, No. 6, Jun. 2002, pp. 1277-1294, XP002314708 ISSN: 0018-9448 abstract right-hand column, paragraph 1.
Voltz, P. J., "Characterization of the optimum transmitter correlation matrix for MIMO with antenna subset selection", IEEE Transactions on Communications, Vol. 51, No. 11, pp. 1779-1782, (Nov. 1, 2003).
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, no. St. Julian; Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Ken Murakami et al., "Status Toward Standardization at IEEE 802. 3ah and items on the construction of GE-PON system," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-WG1 # 41 R1-050476, Internet <URL:http://www.3gpp.org/ftp/tsg_ran/WG1_RL1/TSGR1_41/Docs/R1-050476.zip>, May 9, 2005.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Miorandi D., et al., "Analysis of master-slave protocols for real-time industrial communications over IEEE 802.11 WLANs" Industrial Informatics, 2004. Indin '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
European Search Report—EP10164128—Search Authority—Munich—Jun. 22, 2010.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.

(56) References Cited

OTHER PUBLICATIONS

LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1 / DOCS / [retrieved on Feb. 7, 2012].
Taiwan Search Report—TW101105728—TIPO—Nov. 13, 2013.
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6, 1-7, 1-16, 6-65, 7-11, 7-33, 7-37~7-55, 9-21, 9-22, 9-24~9-32.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999-Fall, IEEE VTS 50TH Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

\* cited by examiner

700

| CQI | PACKET SIZE | TRAFFIC TYPE | BW REQUEST | ... | QOS | BUFFER LEVEL |
|---|---|---|---|---|---|---|
| $R_1 > P_1$ | $AS_{1,1}$ | $AS_{2,1}$ | $AS_{3,1}$ | ... | $AS_{M-1,1}$ | $AS_{M,1}$ |
| $P_2 > R_2 > P_1$ | $AS_{1,2}$ | $AS_{2,2}$ | $AS_{2,2}$ | ... | $AS_{M-1,2}$ | $AS_{M,2}$ |
| $P_3 > R_3 > P_2$ | $AS_{1,3}$ | $AS_{2,3}$ | $AS_{3,3}$ | ... | $AS_{M-1,3}$ | $AS_{M,3}$ |
| ⋮ | ⋮ | ⋮ | ⋮ | ... | ⋮ | ⋮ |
| $P_x > R_{N-1} > P_y$ | $AS_{1,N-1}$ | $AS_{2,N-1}$ | $AS_{3,N-1}$ | ... | $AS_{M-1,N-1}$ | $AS_{M,N-1}$ |
| $R_N < P_x$ | $AS_{1,N}$ | $AS_{2,N}$ | $AS_{3,N}$ | ... | $AS_{M-1,N}$ | $AS_{M,N}$ |

FIGURE 7

EFFICIENT SIGNALING OVER ACCESS CHANNEL

CROSS-REFERENCE TO RELATED APPLICATION

This application claims priority to U.S. Provisional Patent Application Ser. No. 60/590,113, filed Jul. 21, 2004, which is incorporated herein by reference in its entirety.

BACKGROUND

1. Field

The invention relates generally to wireless communications, and more specifically to data transmission in a multiple access wireless communication system.

2. Background

An access channel is used on the reverse link by an access terminal for initial contact with an access point. The access terminal may initiate an access attempt in order to request dedicated channels, to register, or to perform a handoff, etc. Before initiating an access attempt, the access terminal receives information from the downlink channel in order to determine the strongest signal strength from nearby access points and acquire downlink timing. The access terminal is then able to decode the information transmitted by the given access point on a broadcast channel regarding choice of parameters governing the access terminal's access attempt.

In some wireless communication systems, an access channel refers both to a probe and message being rendered. In other wireless communication systems, the access channel refers to the probe only. Once the probe is acknowledged, a message governing the access terminal's access attempt is transmitted.

In an orthogonal frequency division multiple access (OFDMA) system, an access terminal typically separates the access transmission to be transmitted on the access channel into parts, a preamble transmission and a payload transmission. To prevent intra-cell interference due to lack of fine timing on the reverse link during the access preamble transmission, a CDM-based preamble transmission may be time-division-multiplexed with the rest of the transmissions (i.e., traffic, control, and access payload). To access the system, the access terminal then randomly selects one PN sequence out of a group of PN sequences and sends it as its preamble during the access slot.

The access point searches for any preambles (i.e., all possible PN sequences) that may have been transmitted during the access slot. Access preamble transmission performance is measured in terms of collision probability, misdetection probability and false alarm probability. Collision probability refers to the probability that a particular pseudo-random (PN) sequence is chosen by more than one access terminal as its preamble in the same access slot. This probability is inversely proportional to the number of preamble sequences available. Misdetection probability refers to the probability that a transmitted PN sequence is not detected by the base station. False alarm probability refers to the probability that an access point erroneously declared that a preamble has been transmitted while no preamble is actually transmitted. This probability increases with the number of preambles available.

The access point then transmits an acknowledgment for each of the preambles detected. The acknowledgement message may include a PN sequence detected, timing offset correction, and index of the channel for access payload transmission. Access terminals whose PN sequence is acknowledged can then transmit the respective access payload using the assigned resource.

Because the access point has no prior knowledge of where the access terminal is in the system (i.e. what its power requirements, buffer level, or quality of service may be), the acknowledgement message is broadcasted at a power level high enough such that all access terminals in the given cell can decode the message. The broadcast acknowledgement is inefficient as it requires a disproportionate amount of transmit power and/or frequency bandwidth to close the link. Thus, there is a need to more efficiently send an acknowledgment message to access terminals in a given cell.

SUMMARY

Embodiments of the invention minimize use of a broadcast acknowledgement channel during its preamble transmission. Embodiments of the invention further addresses how information regarding forward link channel quality can be efficiently signaled over the access channel during access preamble transmission.

In one embodiment, an apparatus and method for transmitting an indicator of channel quality minimizing the use of a broadcast channel is described. A metric of forward link geometry of observed transmission signals is determined. An indicator of channel quality value is determined as a function of the observed transmission signals. An access sequence is selected, randomly, from one group of a plurality of groups of access sequences, wherein each of the plurality of groups of access sequences correspond to different ranges of channel quality values.

The metric of forward link geometry may be determined as a function of observed pilot signals, noise, and/or traffic on data channels. The quantity of access sequences in the plurality of groups access sequences are distributed non-uniformly. In an embodiment, the access sequences are distributed to reflect the distribution of access terminals about the access point. In another embodiment, the access sequences are distributed in proportion to the number of access terminals that need a given amount of power needed to send an indicator of acknowledgment to the access terminal.

In another embodiment, a method of partitioning a plurality of access sequences, is described. A probability distribution of a plurality of access terminals about an access point is determined. The probability distribution is determined as a function of a plurality of access terminals having CQI values within a predetermined ranges. Groups of access sequences are assigned in proportion to the probability distribution. Access sequences can be reassigned as a function of a change in distribution of access terminals about the access point.

In yet another embodiment, an apparatus and method of transmitting an acknowledgement of a detected access sequence is described. An access sequence is received. The access sequence can be looked-up in a look-up table, stored in memory, to determine at least one attribute of the given access terminal (as a function of the access sequence). The attribute can be information such as a channel quality indicator, a buffer level and a quality of service indicator. Information is then transmitted to the access terminal, where the information is commensurate and consistent with the attribute. Information transmitted may include an indicator of acknowledgment. The indicator of acknowledgment may be transmitted over a shared signalling channel (SSCH).

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 7 illustrates a table stored in memory that partitions the group of access sequences into sub-groups of access sequences based on a variety of factors.

DETAILED DESCRIPTION

Figure 1:
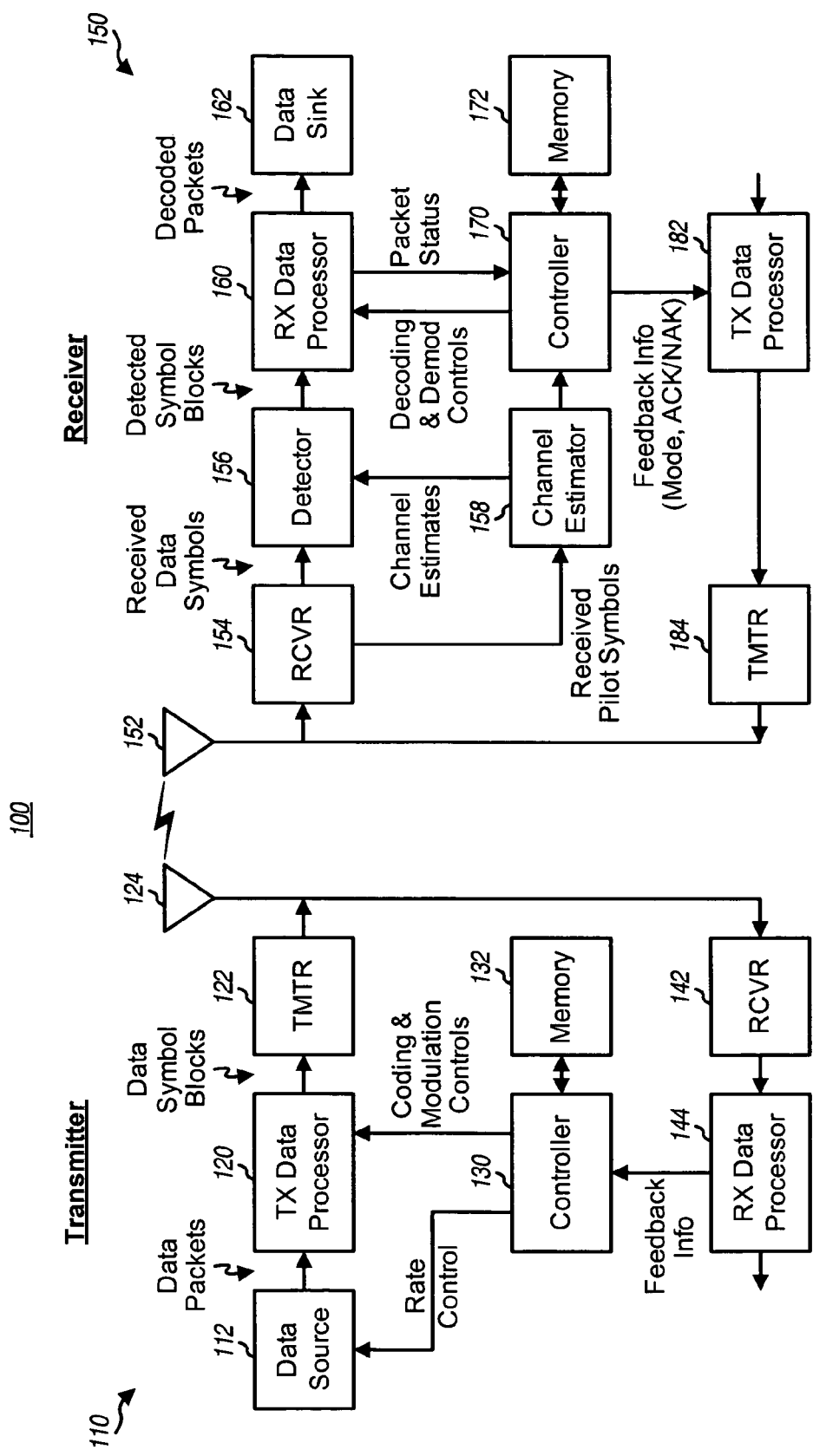
FIG. 1 illustrates a block diagram of a transmitter and a receiver.

The word "exemplary" is used herein to mean "serving as an example, instance, or illustration." Any embodiment or design described herein as "exemplary" is not necessarily to be construed as preferred or advantageous over other embodiments or designs.

The techniques described herein for using multiple modulation schemes for a single packet may be used for various communication systems such as an Orthogonal Frequency Division Multiple Access (OFDMA) system, a Code Division Multiple Access (CDMA) system, a Time Division Multiple Access (TDMA) system, a Frequency Division Multiple Access (FDMA) system, an orthogonal frequency division multiplexing (OFDM)-based system, a single-input single-output (SISO) system, a multiple-input multiple-output (MIMO) system, and so on. These techniques may be used for systems that utilize incremental redundancy (IR) and systems that do not utilize IR (e.g., systems that simply repeats data).

Embodiments of the invention avoid use of a broadcast acknowledgement channel by having the access terminals indicate a parameter, such as forward link channel quality (i.e., CQI), buffer level requirements, quality of service requirements, etc., during its preamble transmission. By having the access terminals indicate forward link channel quality, the access point can transmit each acknowledgment on a channel using an appropriate amount of power for a given access terminal or group of access terminals. In the case of the acknowledgment message being transmitted to a group of access terminals, an acknowledgment message is sent to multiple access terminals who have indicated the same or similar CQI values (within a range). Embodiments of the invention further address how CQI can be efficiently signaled over the access channel during access preamble transmission.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber station, subscriber unit, mobile station, wireless device, mobile, remote station, remote terminal, user terminal, user agent, or user equipment. A subscriber station may be a cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals or other access points. The access point acts as a router between the access terminal and the rest of the access network, which may include an IP network, by converting received air-interface frames to IP packets. Access points also coordinate the management of attributes for the air interface. An access point may be a base station, sectors of a base station, and/or a combination of a base transceiver station (BTS) and a base station controller (BSC).

FIG. 1 illustrates a block diagram of a transmitter 110 and a receiver 150 in a wireless communication system 100. At transmitter 110 a TX data processor 120 receives data packets from a data source 112. TX data processor 120 processes (e.g., formats, encodes, partitions, interleaves, and modulates) each data packet in accordance with a mode selected for that packet and generates up to T blocks of data symbols for the packet. The selected mode for each data packet may indicate (1) the packet size (i.e., the number of information bits for the packet) and (2) the particular combination of code rate and modulation scheme to use for each data symbol block of that packet. A controller 130 provides various controls to data source 112 and TX data processor 120 for each data packet based on the selected mode. TX data processor 120 provides a stream of data symbol blocks (e.g., one block for each frame), where the blocks for each packet may be interlaced with the blocks for one or more other packets.

A transmitter unit (TMTR) 122 receives the stream of data symbol blocks from TX data processor 120 and generates a modulated signal. Transmitter unit 122 multiplexes in pilot symbols with the data symbols (e.g., using time, frequency, and/or code division multiplexing) and obtains a stream of transmit symbols. Each transmit symbol may be a data symbol, a pilot symbol, or a null symbol having a signal value of zero. Transmitter unit 122 may perform OFDM modulation if OFDM is used by the system. Transmitter unit 122 generates a stream of time-domain samples and further conditions (e.g., converts to analog, frequency upconverts, filters, and amplifies) the sample stream to generate the modulated signal. The modulated signal is then transmitted from an antenna 124 and via a communication channel to receiver 150.

At receiver 150, the transmitted signal is received by an antenna 152, and the received signal is provided to a receiver unit (RCVR) 154. Receiver unit 154 conditions, digitizes, and pre-processes (e.g., OFDM demodulates) the received signal to obtain received data symbols and received pilot symbols. Receiver unit 154 provides the received data symbols to a detector 156 and the received pilot symbols to a channel estimator 158. Channel estimator 158 processes the received pilot symbols and provides channel estimates (e.g., channel gain estimates and SINR estimates) for the communication channel. Detector 156 performs detection on the received data symbols with the channel estimates and provides detected data symbols to an RX data processor 160. The detected data symbols may be represented by log-likelihood ratios (LLRs) for the code bits used to form the data symbols (as described below) or by other representations. Whenever a new block of detected data symbols is obtained for a given data packet, RX data processor 160 processes (e.g., deinterleaves and decodes) all detected data symbols obtained for that packet and provides a decoded packet to a data sink 162. RX data processor 160 also checks the decoded packet and provides the packet status, which indicates whether the packet is decoded correctly or in error.

A controller 170 receives the channel estimates from channel estimator 158 and the packet status from RX data processor 160. Controller 170 selects a mode for the next data packet to be transmitted to receiver 150 based on the channel estimates. Controller 170 also assembles feedback information. The feedback information is processed by a TX data processor 182, further conditioned by a transmitter unit 184, and transmitted via antenna 152 to transmitter 110.

At transmitter 110, the transmitted signal from receiver 150 is received by antenna 124, conditioned by a receiver unit 142, and further processed by an RX data processor 144 to recover the feedback information sent by receiver 150. Controller 130 obtains the received feedback information, uses the ACK/NAK to control the IR transmission of the packet being sent to receiver 150, and uses the selected mode to process the next data packet to send to receiver 150. Controllers 130 and 170 direct the operation at transmitter 110 and receiver 150, respectively. Memory units 132 and 172 provide storage for program codes and data used by controllers 130 and 170, respectively.

Figure 2:
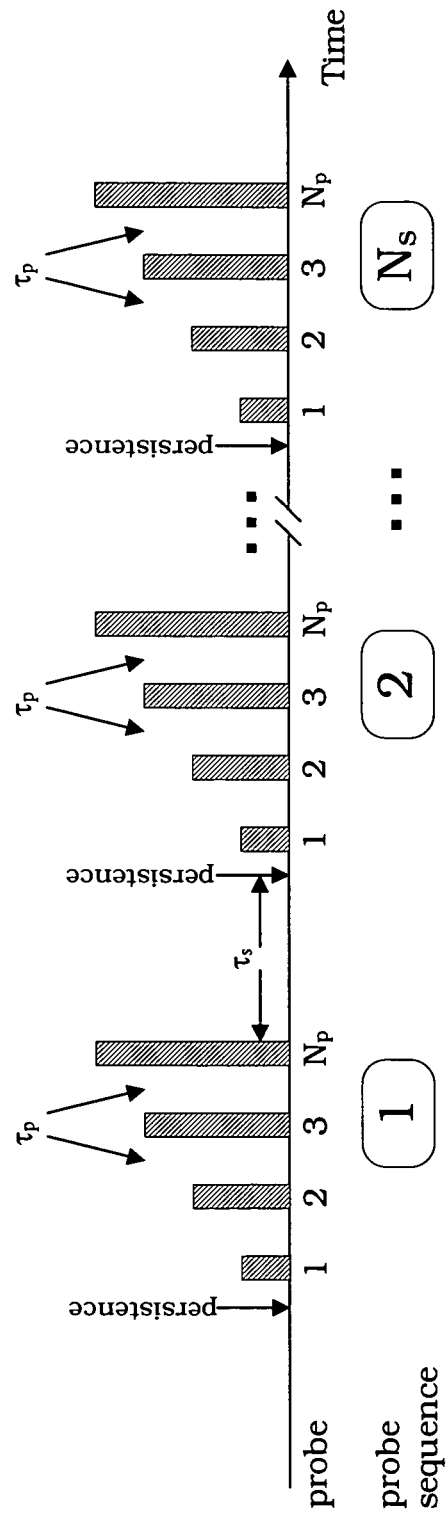
FIG. 2 illustrates the access probe structure and the access probe sequence.

FIG. 2 illustrates the access probe structure and the access probe sequence 200. In FIG. 2, Ns probe sequences are shown, where each probe sequence has Np probes. The media access control layer (MAC) protocol transmits access probes by instructing the physical layer to transmit a probe. With the instruction, the access channel MAC protocol provides the physical layer with a number of elements, including, but not limited to, the power level, access sequence identification, pilot PN of the sector to which the access probe is to be transmitted, a timing offset field and a control segment field. Each probe in a sequence is transmitted at increasing power until the access terminal receives an access grant. Transmission is aborted if the protocol received a deactivate command, or if a maximum number of probes per sequence have been transmitted. Prior to transmission of the first probe of all probe sequences, the access terminal forms a persistence test which is used to control congestion on the access channel.

Figure 3:
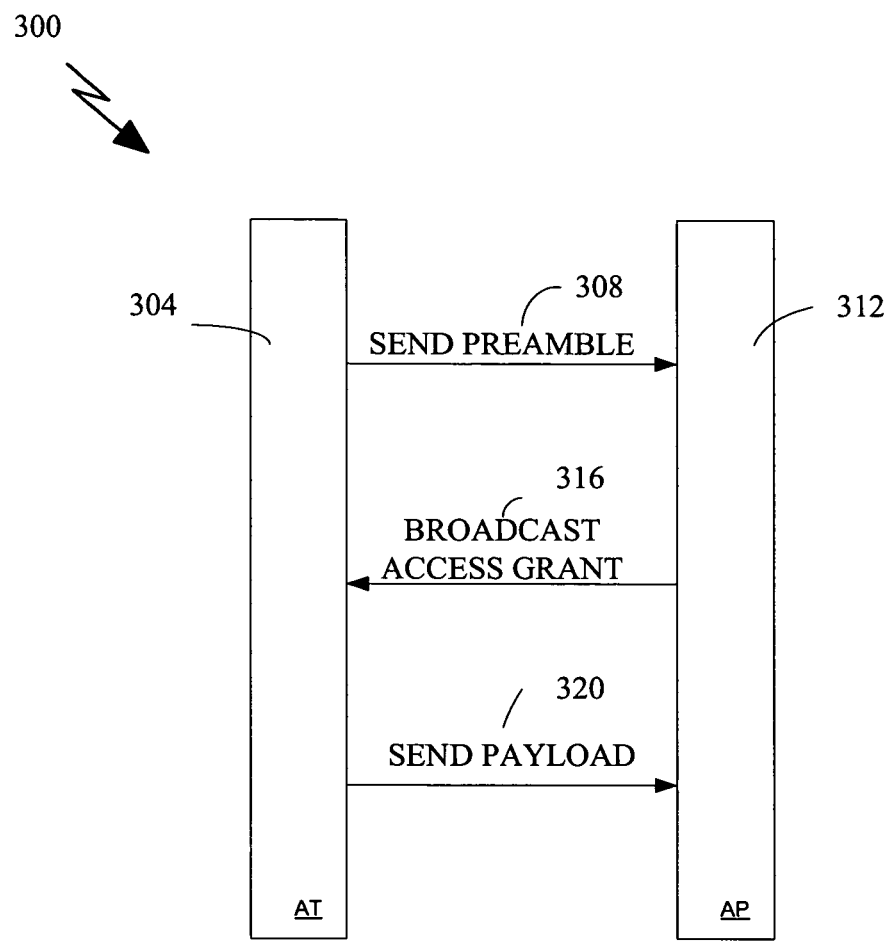
FIG. 3 illustrates a traditional call flow between an access terminal and an access point.

FIG. 3 illustrates a traditional call flow between an access terminal and an access point 300. Access terminal 304 randomly selects a preamble, or PN sequence, out of a group of PN sequences and sends 308 the preamble during the access slot to the access point 312. Upon receipt, the access point 312 then transmits 316 an access grant, including a broadcast acknowledgement, for each of the preambles detected. This acknowledgement is a broadcasted acknowledgement transmitted at a high enough power such that all of the access terminals in a given cell are able to decode the broadcast acknowledgement. This is deemed necessary because the access point has no prior knowledge where the access terminals are in the system, and thus has no knowledge as to the power level necessary for the access terminal to decode the broadcasted acknowledgement. On receipt of the accent grant 316, access terminal 304 sends 320 the payload as per the defined resources allocated in the access grant.

Figure 4:
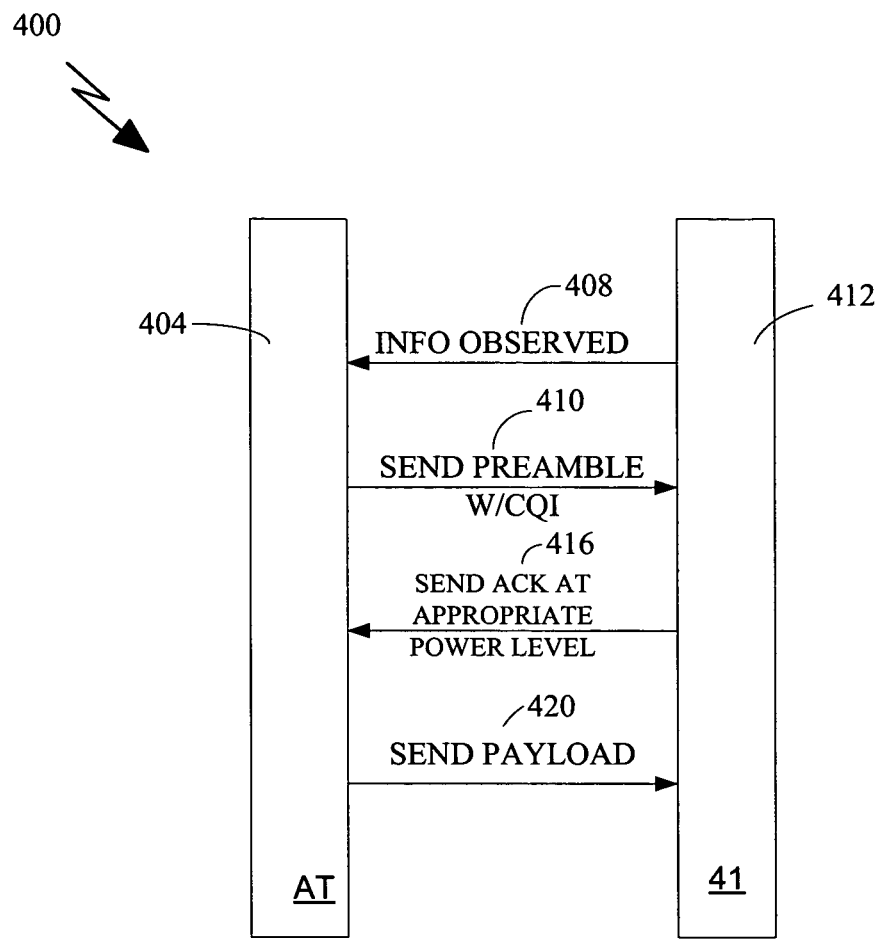
FIG. 4 illustrates an embodiment of the invention that avoids the use of the broadcast acknowledgement.

The broadcast acknowledgement transmission described above is relatively inefficient as it requires a disproportionate amount of transmit power and/or frequency bandwidth to close the link. FIG. 4 illustrates an embodiment 400 that avoids the use of the broadcast acknowledgement. An access terminal observes 408 transmissions from access points. In Observing, the access terminal determines the power of transmissions it receives. These observations typically involve determining forward link channel quality from observed acquisition pilot signal transmissions or pilot transmissions as part of a shared signaling channel (SSCH) channel.

The access terminal 404 then randomly selects a preamble, or access sequence, out of a group of access sequences and sends the preamble 410 to the access point 412. This preamble is transmitted along with some knowledge of forward link channel quality (CQI). CQI information may be transmitted as within the preamble, or appended to it. In another embodiment, an access sequence is randomly chosen out of a plurality of groups of access sequences, where each group of access sequences is designated for a range of CQI values. For example, indications of forward link channel quality may be observed pilot signal power. The observed pilot signal power may be quantized to CQI values based on a predetermined set of values. Thus, a given range of received pilot signal power may correspond to a given CQI value. Accordingly, the access point 412 may determine the CQI of a given access terminal by virtue of the access sequence chosen by the access terminal.

Because the access terminal sends an indicator of forward link channel quality during its initial access attempt with the access point 412, the access point 412 has the knowledge needed to transmit 416 each acknowledgement on a channel using an appropriate amount of power for the designated access terminal 404. In an embodiment, the acknowledgment message may be sent to a group of access terminals having the same or similar CQI values. This may be through use of the SSCH. Thus, based on the power level needed for the access terminal to successfully receive the transmission, the access point sends the acknowledgement message in the appropriate section of the SSCH message.

In addition to CQI information, the access terminal may send other information of interest to the access point during the initial access phase. For example, the access terminal may send a buffer level indicator, indicating the amount of data the access terminal intends to send to the access point. With such knowledge, the access point is able to appropriately dimension initial resource assignments.

The access terminal may also send information regarding priority groups or quality of service. This information may be used to prioritize access terminals in the event of limited access point capability or system overload.

Upon receipt of the access grant message by the access terminal, the access terminal 404 sends 420 payload as per the resources defined in the access grant message. By receiving additional information during the initial access phase, the access point will be able to take advantage of knowing the CQI, buffer level and quality of service information as part of the access grant message.

Figure 5:
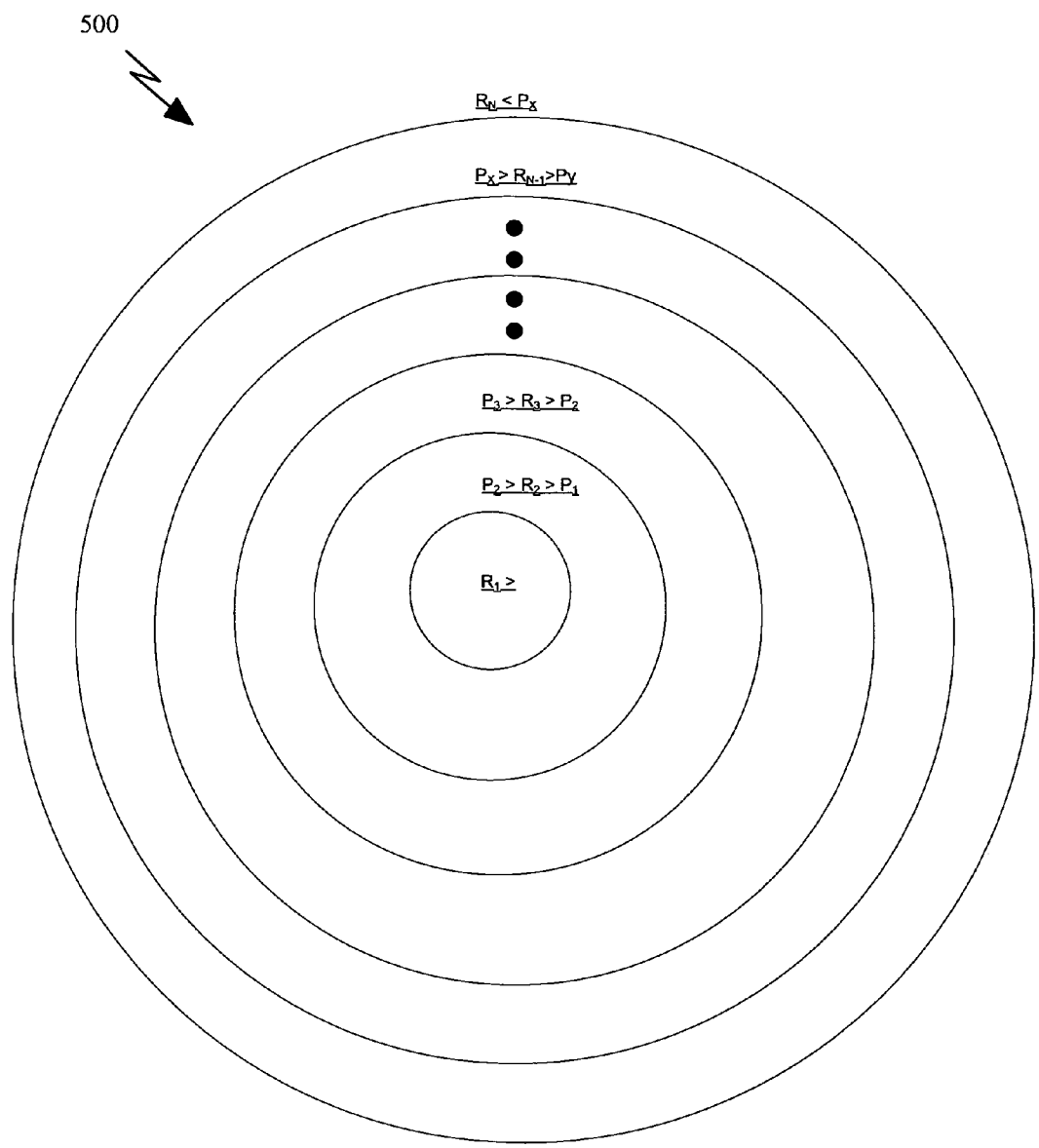
FIG. 5 illustrates a cell partitioned using uniform spacing.

FIG. 5 illustrates a cell 500 partitioned using uniform spacing. The cell is divided into a number of regions R, wherein each region is defined by having a probability of observed metrics within a given range. In an embodiment, observations of forward link geometry are used. For example, metrics such as C/I, where C is the received pilot power and I is the observed noise, may be used. Also, C/(C+I) may be used. In other words, some measure that utilizes observed signal power and noise is used. These observed metrics correspond to given CQI values, or value ranges, which thus define the region. For example, Region $R_1$ defines a Region having CQI values corresponding to power and/or noise levels greater than $P_1$. Region $R_2$ defines a region having CQI values corresponding to power and/or noise levels such that $P_2>R_2>P_1$. Similarly, Region $R_3$ defines a Region having CQI values corresponding to power and/or noise levels such that $P_3>R_3>P_2$, and so on. Region $R_{N-1}$ has CQI values corresponding to power and/or noise levels such that they fall in the range of $P_x > R_{N-1} > P_y$. Similarly, Region RN has CQI values corresponding to power and/or noise levels observed $<P_x$.

Theoretically, by choosing to transmit one of N possible preamble sequences, up to $\log_2(N)$ bits of information may be conveyed. For example, when N=1024, as many as $\log_2(1024)=10$ bits may be conveyed. Thus, by choosing which preamble sequence to transmit, it is possible for user dependent information to be embedded as part of the preamble transmission.

A commonly used technique is to partition then N preamble sequences into M distinct sets, labeled $\{1, 2, \ldots, M\}$ To signal one of $\log_2(M)$ possibilities (i.e., $\log_2(M)$ bits), a sequence in an appropriate set is chosen and transmitted. For instance, to signal message index $k \in \{1, 2, \ldots, M\}$, a sequence in the $k^{th}$ set is (randomly) chosen and transmitted. Assuming correct detection at the receiver, the transmitted information (i.e., the $\log_2(M)$-bit message) can be obtained based on the index of the set that the received sequence belongs to.

In a uniform partitioning strategy, where the N preamble sequences are uniformly partitioned into M groups (i.e., each group contains N/M sequences). Based on the measured CQI value, one of the preamble sequences from an appropriate set is selected and transmitted. The collision probability, then, depends on the mapping/quantization of the measured CQI and the number of simultaneous access attempts.

This can be illustrated by considering a simple 2-level quantization of CQI (i.e., M=2), with $\Pr(M(CQI)=1)=\alpha$ and $\Pr(M(CQI)=1)=\alpha$, where $M(x)$ is a quantization function mapping the measured CQI value into one of the two levels.

With uniform access sequence partitioning, the N preamble sequences are partitioned into two sets with N/2 sequences in each set. As by example, assume that there are two simultaneous access attempts (i.e., exactly two access terminals are trying to access the system in each access slot). The collision probability is given by $$\alpha^2 \frac{1}{\left(\frac{N}{2}\right)} + (1-\alpha)^2 \frac{1}{\left(\frac{N}{2}\right)}.$$

With probability $\alpha^2$, the two access terminals wish to send M=1 (i.e., they both have quantized CQI level=1). Since there are N/2 preamble sequences to choose from in the first set, the collision probability (given that both access terminals choose their sequence from this set) is 1/(N/2). Following the same logic, the collision probability for the other set can be derived.

Thus, the overall collision probability depends on the parameter $\alpha$ and number of simultaneous access attempts. The collision probability can be as high as 2/N ($\alpha=0.1$) or as low as 1/N ($\alpha=0.5$). Thus, the best choice of $\alpha$ in this case is $\alpha=0.5$. However, it is unclear whether the CQI quantization function that results in $\alpha=0.5$ is a desirable function.

The access point will transmit the acknowledgment channel at the power level required to close the link as indicated by the CQI level. In this example, with probability $\alpha$, the access point has to transmit at the power corresponding to that of a broadcast channel and with probability 1-$\alpha$, the access point can transmit at some lower power. Thus, with $\alpha=0.5$, half the time the access point has to broadcast the acknowledgment channel. On the other hand, by choosing $\alpha=0.5$, the access point is forced to broadcast the acknowledgement channel less frequently but incurring an increase in the transmit power in the remaining of the time and higher overall collision probability.

Figure 6:
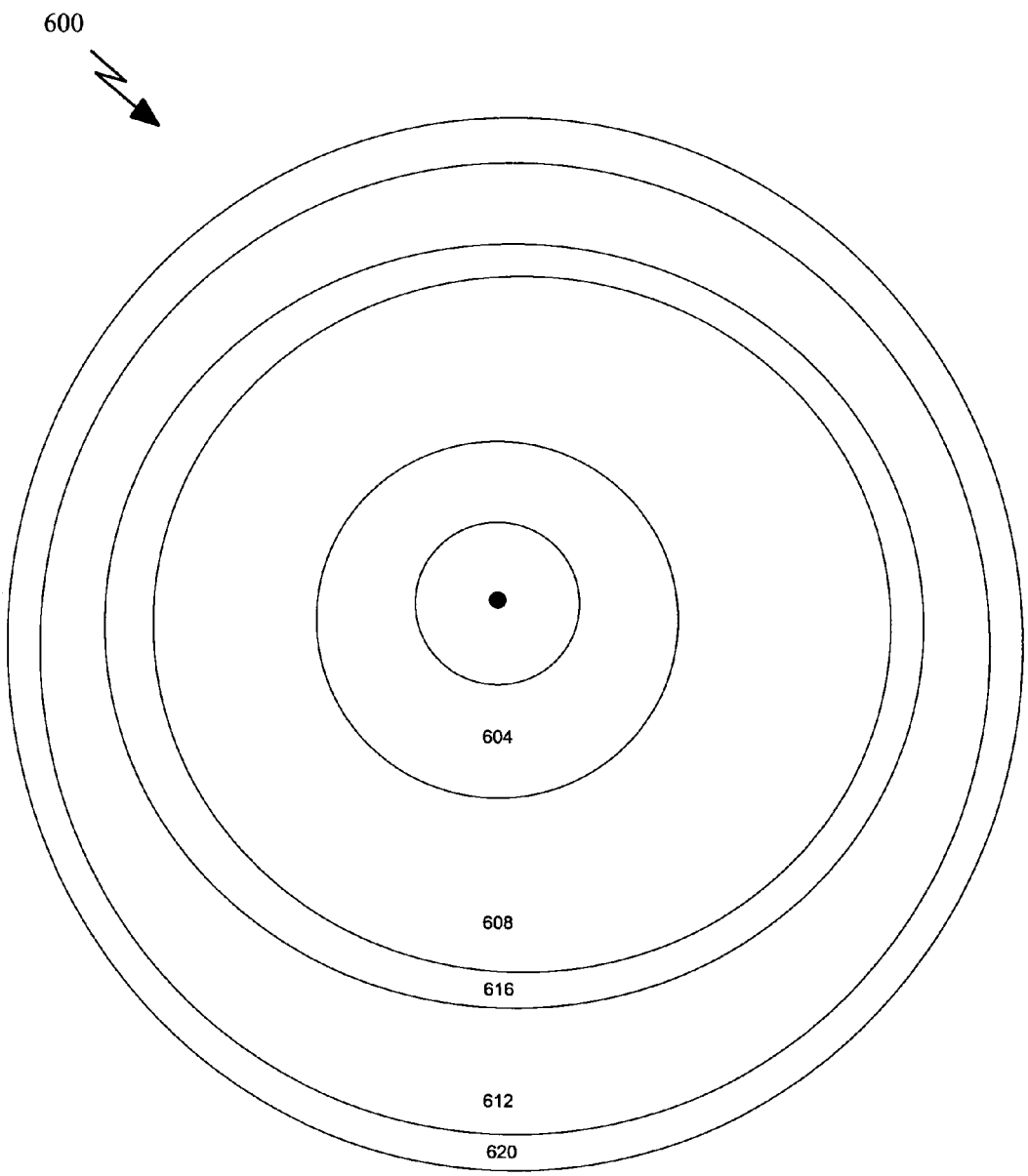
FIG. 6 illustrates a diagram showing weighted partitioning based on quantized CQI values.

FIG. 6 illustrates a diagram showing weighted partitioning 600 based on quantized CQI values. The region is partitioned into various regions that are not of a uniform space, but are rather partitioned based on quantized CQI values that are weighted. By weighting the regions, additional preamble sequences are available in regions that have a higher probability of access terminals being in that region (i.e., a higher mass function). For example, regions 604, 608, and 612 are larger regions that may correspond to having a larger number of access sequences available. Conversely, regions 616 and 620 are smaller regions that may indicate smaller quantities of users present and thus fewer access sequences available. Thus, the regions may be partitioned having some prior knowledge as to the distribution of C/I or received power in a specified range in a given cell. It is contemplated that geographic regions may not always represent concentrations of users within given CQI ranges. Rather, the graphical representations of non-uniform spacing is to indicate the non-uniform distribution of access sequences through a given cell region.

In an embodiment, the probability distribution of access terminals within the cell may be dynamic based on the distribution of access terminals over time. Accordingly, certain partitioned regions may be larger or smaller based on the absence or presence of access terminals at a given time of the day, or otherwise adjusted as a function of the concentration of access terminals present in a given CQI region.

Thus, the sequences available for initial access are divided into N number of partitions. The access terminal determines the partition to be used for the access attempt based on at least the observed pilot power and buffer level. It is contemplated that the partition may also be determined on a number of other factors, such as packet size, traffic type, bandwidth request, or quality of service. Once the partition is determined, the access terminals select the sequence ID using a uniform probability over that partition. Of the available sequences for access, a subset of sequences is reserved for active set operations, and another subset of sequences are available for initial access. In one embodiment, sequences 0, 1 and 2 are reserved for active set operations, and sequences 3 through the total number of access sequences are available for initial access.

The size of each partition is determined by the access sequence partition field in the system information block. This is typically part of the sector parameter. A particular partition number N comprises sequence identifiers ranging from a lower threshold, partition N lower, to an upper threshold, partition N upper. Both thresholds are determined using the partitions size, partially provided in table 1 below:

| Access Sequence | Partition N Size (N from 1 to 8) | | | | | | | |
|---|---|---|---|---|---|---|---|---|
| Partition | 1 | 2 | 3 | 4 | 5 | 6 | 7 | 8 |
| 00000 | 0 | 0 | 0 | 0 | 0 | 0 | 0 | 0 |
| 00001 | S2 | S2 | S2 | S2 | S2 | S2 | S2 | S2 |
| 00010 | S3 | S3 | S | S1 | S1 | S1 | S1 | S1 |
| 00011 | S1 | S1 | S1 | S3 | S3 | S3 | S1 | S1 |
| 00100 | S1 | S1 | S1 | S1 | S1 | S1 | S3 | S3 |
| 00101 | S3 | S1 | S1 | S3 | S1 | S1 | S3 | S1 |
| 00101 | S1 | S3 | S1 | S1 | S3 | S1 | S1 | S3 |
| 00110 | S1 | S1 | S3 | S1 | S1 | S3 | S1 | S1 |
| 00111 | S3 | S3 | S1 | S3 | S1 | S1 | S1 | S1 |
| 01000 | S1 | S1 | S1 | S3 | S1 | S3 | S1 | S1 |

This, in this embodiment the access terminal selects its pilot level based on the ratio, measured in decibels, of the acquisition pilot power from the sector where the access attempt is being made to the total power received in the acquisition channel time slot. The pilot threshold values are determined based on the pilot strength segmentation field of the system information message.

Embodiments describe a technique whereby the access sequence space is partitioned according to the statistics of the quantized CQI. More precisely, $$p = [p_1 p_2 \ldots p_M]$$

is the probability mass function of the quantized CQI values, where $$Pr(CQI=1) = p_1, Pr(CQI=2) = p_2, \ldots, Pr(CQI=M) = p_M).$$

The access sequence space is then partitioned to have a similar probability mass function. That is, the ratio of the number of access sequences in each set to the total number of access sequences should be proportional, such that $$p[p_1 \ p_2 \ \ldots \ p_M] (\text{i.e.,} \left(\frac{N_1}{N}, \frac{N_2}{N}, \ldots, \frac{N_M}{N}\right) = (p_1 \ p_2 \ \ldots \ p_M),$$

where $N_k$ is the number of access sequences in set $K \in \{1, 2, \ldots, M\}$ In the example describing the 2-level CQI quantization function yields the following:

$$Pr(M(CQI)=1) = \alpha \text{ and } Pr(M(CQI)=2) = 1-\alpha$$

The number of access sequences in each set is, therefore, $(\alpha)N$ and $(1-\alpha)N$, respectively. The resulting collision probability is $$\alpha^2 \frac{1}{(\alpha N)} + (1-\alpha)^2 \frac{1}{((1-\alpha)N)} = \frac{\alpha}{N} + \frac{(1-\alpha)}{N} = \frac{1}{N},$$

which is the smallest collision probability possible.

For a more general setting with M possible CQI levels and U simultaneous attempts, the analytical expression of the collision probability becomes more complex.

In another example, consider M=6, U=8, and N=1024. Assume that the CQI values are quantized in the step of 4-5 dB. The quantized CQI values are given by [−3, 1, 5, 10, 15, 20] dB with the following probability mass function [0.05, 0.25, 0.25 0.20 0.15 0.10]. That is, 5% of the time, users will report CQI values lower than −3 dB, 25% of the time with CQI values between −3 and 1 dB, and so on. The access point can then adjust the power for the acknowledgment channel based on the reported CQI.

Using the proposed access sequence partitioning technique, the resulting collision probability is approximately 2.5%. The collision probability using uniform access sequence partitioning compared is 3.3%. However, to get a similar collision probability when a uniform access sequence partitioning is used, the total number of sequences has to be increased by 25% to 1280. Accordingly, a larger number of access sequences to search translates directly to higher complexity and higher false alarm probability.

This partitioning strategy can also be used when signaling other information such as packet size, traffic type, and bandwidth request over the access channel. This is particularly useful when the access channel (the preamble portion) is used as a means for users to get back into the system or to request resources. If information regarding the statistics of information to be conveyed is known (e.g., percentage of times a certain traffic connection (http, ftp, SMS) is requested or how much bandwidth is often required, etc.), then this information can be used in determining the partition of the access preamble sequence space.

FIG. 7 illustrates a table 700 stored in memory that partitions the group of access sequences into sub-groups of access sequences based on a variety of factors. Factors include CQI ranges, buffer level, quality of service, packet size, frequency bandwidth request, or other factors. The quantity of access sequences in a given sub-group may be initially determined on statistics maintained of past concentration of users in the given cell as a function of the factors being considered. Thus, each cell may have a predetermined mass distribution of access sequences for combinations of the various factors. In so doing, the collision probability of multiple users selecting the same access sequence is minimized.

In an embodiment, the quantity of access sequences assigned to various combinations of factors may dynamically change based on changes in the composition of users needs. Thus, if a higher quantity of users migrate to a region with a CQI within a given range and a buffer level of a certain amount, and other various factors, that region may be assigned additional access sequences. Dynamic allocation of access sequences thus mimics an optimal scenario whereby the collision probability is minimized.

Figure 8:
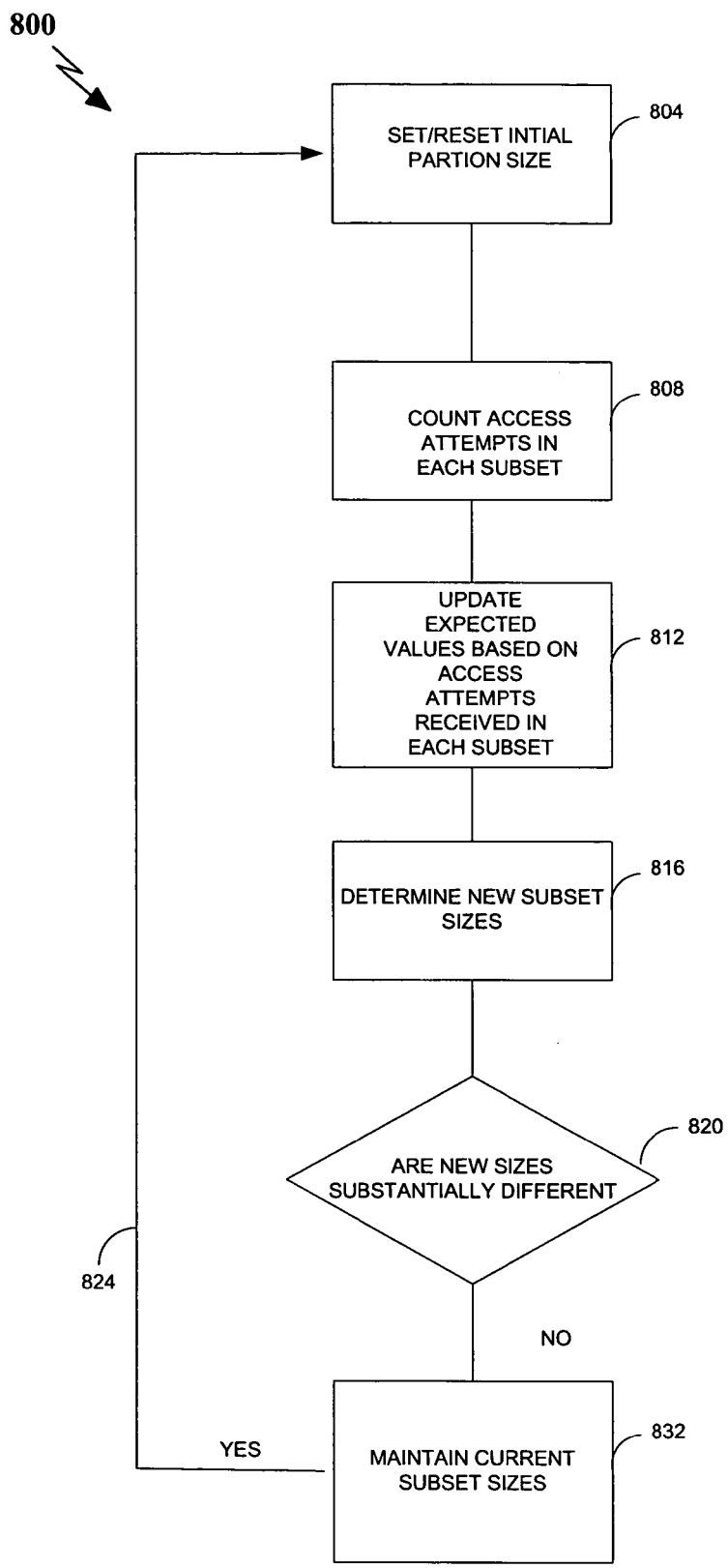
FIG. 8 illustrates a process for dynamically allocating access sequences.

FIG. 8 illustrates such a process 800. Initial partitions are set 804, thereby partitioning the plurality of access sequences into a number of groups of access sequences. These groups may be based on ranges of CQI values. In an embodiment, the initial set may be based on uniform distribution of access sequences. In another embodiment, the initial partition sizes may be based on historical data. A counter 808 counts the access attempts in each subset. The counter can keep track of the access attempts over time to determine if there are patterns of varying heavy or light usage. Based on this access attempts over time, the expected value of access attempts in given subsets may be updated 812. The expected value may be represented by the following equation:

$$E_m := (1-\beta)E_m + \beta a_m(a_m - 1)$$

where $E_m$ is the expected value, $a_m$ represents the quantity of access sequences in a given subset, and $\beta$ is the forgetting factor. The forgetting factor computes an average recursively, that gives a larger weight to more recent data and a lesser weight to less recent data.

Based on the new expected value, the new subset size may be determined 816. In an embodiment, the subset size is determined by the following equation:

$$N_m = N \frac{\sqrt{E_m}}{\sum_{k=1}^{M} \sqrt{E_k}}, 1 \leq m \leq M$$

where $N_m$ is the new subset size, $E_k$ is the "old" expectation value of the $k^{th}$ subset, m is the given subset out of M total subsets.

A determination is made 820 as to whether newly determined subset size is substantially different than the previously set subset size. The threshold for what constitutes "substantially different" is configurable. If a determination is made that the newly determined subset size is substantially different 824, then the subset sizes are reset. If not (828), the current subset sizes are maintained 832.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. In a wireless communication system, a method of determining an indicator of channel quality, the method comprising:
    determining a metric of forward link geometry as a function of an observed transmission, wherein said observed transmission is selected from a group consisting of pilot signals, noise, and traffic on data channels, or any combination thereof;
    determining an estimate of channel quality based on at least the metric of the forward link geometry; and
    selecting an access sequence, randomly, from one group of a plurality of groups of access sequences,
    wherein the plurality of groups of access sequences correspond to different ranges of channel quality values, wherein a quantity of access sequences in the plurality of groups of access sequences are distributed non-uniformly, and the selected access sequence is from the group of the plurality of groups corresponding to the determined estimate of channel quality, the access sequences in the plurality of groups of access sequences are distributed in proportion to a number of access terminals requiring a given amount of power needed to send an indicator of acknowledgment to an access terminal.

2. The method set forth in claim 1, wherein determining the metric further comprises determining a power of an observed pilot signal.

3. The method set forth in claim 1, wherein determining the estimate of channel quality further comprises determining a ratio of received pilot power to noise.

4. The method set forth in claim 1, wherein the determining the estimate of channel quality further comprises determining a ratio of received pilot power to the sum of received pilot power and noise.

5. The method set forth in claim 1, wherein the selecting includes selecting the access sequence from one group of a plurality of non-uniformly distributed groups of access sequences.

6. The method set forth in claim 1, further comprising transmitting the selected access sequence.

7. The method set forth in claim 6, wherein said transmitting further comprises transmitting in accordance with a Frequency Division Multiplex (FDM) scheme.

8. The method set forth in claim 6, wherein said transmitting further comprises transmitting in accordance with a Code Division Multiplex (CDM) scheme.

9. The method set forth in claim 6, wherein said transmitting further comprises transmitting in accordance with an Orthogonal Frequency Division Multiple Access (OFDMA) scheme.

10. The method set forth in claim 1, wherein said selecting further comprises selecting information indicative of access terminal requirements.

11. The method set forth in claim 10, wherein said selecting information further comprises selecting information buffer level needs, quality of service requirements, a forward-link channel quality indicator.

12. In a wireless communication system, an apparatus to determine an indicator of channel quality, the apparatus comprising:
    a processor configured to determine a metric of forward link geometry as a function of an observed transmission, wherein said observed transmission is selected from a group consisting of pilot signals, noise, and traffic on data channels, or any combination thereof, and to determine an estimate of channel quality as a function of at least the metric of the observed transmission;
    a memory element configured to store a plurality of groups of access sequences, wherein the plurality of groups of access sequences correspond to different ranges of channel quality values,
    and a plurality of access sequences in the plurality of groups of access sequences are distributed non-uniformly, such that the plurality of access of sequences are distributed in proportion to a number of access terminals requiring a given amount of power needed to send an indicator of acknowledgment to an access terminal; and
    a selector configured to select an access sequence, randomly, from the group of the plurality of groups corresponding to a determined channel quality value.

13. The apparatus set forth in claim 12, wherein the processor determines a ratio of received pilot power to noise.

14. The apparatus set forth in claim 12, further comprising a transmitter configured to transmit the selected access sequence.

15. The apparatus set forth in claim 14, wherein the transmitter is further configured to transmit in accordance with a Frequency Division Multiplex (FDM) scheme.

16. The apparatus set forth in claim 14, wherein the transmitter is further configured to transmit in accordance with a Code Division Multiplex (CDM) scheme.

17. The apparatus set forth in claim 14, wherein the transmitter is further configured to transmit in accordance with an Orthogonal Frequency Division Multiple Access (OFDMA) scheme.

18. The apparatus set forth in claim 12, wherein the selector is further configured to select information indicative of access terminal requirements.

19. The apparatus set forth in claim 18, wherein the information indicative of access terminal requirements comprises buffer level, quality of service requirements, a forward-link channel quality indicator.

20. In a wireless communication system, an apparatus for determining an indicator of channel quality, the apparatus comprising a processor and a memory, the memory containing program code executable by the processor for performing the following:
    determining a power level of an observed transmission, wherein said observed transmission is selected from the group consisting of pilot signals, noise, and traffic on data channels, or any combination thereof;
    determining a channel quality indicator (CQI) value as a function of the power level of the observed transmission; and
    selecting an access sequence, randomly, from one group of a plurality of groups of access sequences, wherein the plurality of groups of access sequences correspond to different ranges of CQI values, the selected access sequence is from the group of the plurality of groups corresponding to the determined CQI value, and the selecting further comprises selecting information indicative of access terminal requirements, wherein a quantity of access sequences in the plurality of groups of access sequences are distributed non-uniformly, the access sequences in the plurality of groups of access sequences are distributed in proportion to a number of access terminals requiring a given amount of power needed to send an indicator of acknowledgment to an access terminal.

21. The apparatus set forth in claim 20, wherein the memory further comprises program code for determining the power level of an observed pilot signal.

22. The apparatus set forth in claim 20, wherein the memory further comprises program code for transmitting the selected access sequence.

23. The apparatus set forth in claim 22, wherein the memory further comprises program code for transmitting in accordance with a Frequency Division Multiplex (FDM) scheme.

24. The apparatus set forth in claim 22, wherein the memory further comprises program code for transmitting in accordance with a Code Division Multiplex (CDM) scheme.

25. The apparatus set forth in claim 22, wherein the memory further comprises program code for transmitting in accordance with an Orthogonal Frequency Division Multiplex (OFDM) scheme.

26. The apparatus set forth in claim 22, wherein the memory further comprises program code for transmitting in accordance with an Orthogonal Frequency Division Multiple Access (OFDMA) scheme.

27. The apparatus set forth in claim 20, wherein the selecting information further comprises selecting information regarding at least one of buffer level needs, quality of service requirements, or a forward-link channel quality indicator.

28. In a wireless communication system, a method of transmitting information regarding access terminal needs, the method comprising:
  determining a received power level of an observed pilot signal;
  determining a channel quality indicator (CQI) value as a function of the received power level; and
  selecting an access sequence, randomly, from one group of a plurality of groups of access sequences, wherein the plurality of groups of access sequences correspond to a plurality of predetermined factors, and
  wherein a quantity of access sequences in the plurality of groups of access sequences are distributed non-uniformly, the access sequences in the plurality of groups of access sequences are distributed in proportion to a number of access terminals requiring a given amount of power needed to send an indicator of acknowledgment to an access terminal.

29. The method set forth in claim 28, wherein the predetermined factors include one or more of ranges of CQI values, ranges of buffer levels, packet size, traffic type, frequency bandwidth request and ranges of quality of service indicators.

30. In a wireless communication system, a method of communicating a channel quality indicator (CQI), the method comprising:
  determining a power level of an observed pilot signal;
  determining a CQI value as a function of the power level of the observed pilot signal;
  selecting an access sequence, randomly, from one group of a plurality of groups of access sequences, wherein the plurality of groups of access sequences correspond to different CQI values, and wherein a quantity of access sequences in the plurality of groups of access sequences are distributed non-uniformly; the access sequences in the plurality of groups of access sequences are distributed in proportion to a number of access terminals requiring a given amount of power needed to send an indicator of acknowledgment to an access terminal;
  appending the CQI value to the selected access sequence; and
  transmitting the selected access sequence and the CQI value.

31. In a wireless communication system, an apparatus for transmitting information regarding access terminal needs, the apparatus comprising a processor and a memory, the memory containing program code executable by the processor for performing the following:
  determining a received power level of an observed pilot signal;
  determining a channel quality indicator (CQI) value as a function of the received power level; and
  selecting an access sequence, randomly, from one group of a plurality of groups of access sequences, wherein the plurality of groups of access sequences correspond to a plurality of predetermined factors, and wherein a quantity of access sequences in the plurality of, groups of access sequences are distributed non-uniformly, the access sequences in the plurality of groups of access sequences are distributed in proportion to a number of access terminals requiring a given amount of power needed to send an indicator of acknowledgment to an access terminal.

32. The apparatus set forth in claim 31, wherein the predetermined factors include one or more of ranges of CQI values, ranges of buffer levels, packet size, traffic type, frequency bandwidth request and ranges of quality of service indicators.

33. In a wireless communication system, an apparatus for communicating a channel quality indicator (CQI), the apparatus comprising a processor and a memory, the memory containing program code executable by the processor for performing the following:
  determining a power level of an observed pilot signal;
  determining a CQI value as a function of the power level of the observed pilot signal;
  selecting an access sequence, randomly, from one group of a plurality of groups of access sequences, wherein the plurality of groups of access sequences correspond to different CQI values, and wherein a quantity of access sequences in the plurality of groups of access sequences are distributed non-uniformly, the access sequences in the plurality of groups of access sequences are distributed in proportion to a number of access terminals requiring a given amount of power needed to send an indicator of acknowledgment to an access terminal;
  appending the CQI value to the selected access sequence; and
  transmitting the selected access sequence and the CQI value.

* * * * *